United States Patent [19]

Eisele

[11] 4,014,230
[45] Mar. 29, 1977

[54] SHEET METAL SHEARS FOR METAL SHEETS AND PLATES WITH A HIGHLY SENSITIVE SURFACE

[75] Inventor: Franz Eisele, Kuchen, Germany

[73] Assignee: Wurttembergische Metallwarenfabrik, Geislingen, Germany

[22] Filed: Dec. 11, 1975

[21] Appl. No.: 639,965

[30] Foreign Application Priority Data

Dec. 11, 1974 Germany .......................... 2458655

[52] U.S. Cl. ..................................... 83/86; 83/157
[51] Int. Cl.² .......................................... B26D 7/06
[58] Field of Search ............................... 83/157, 86

[56] References Cited

UNITED STATES PATENTS

| | | | |
|---|---|---|---|
| 2,933,966 | 4/1960 | Dehn | 83/157 X |
| 3,631,750 | 1/1972 | Hanni | 83/157 |
| 3,760,668 | 9/1973 | Spaulding | 83/157 X |
| 3,893,358 | 7/1975 | Dixon | 83/157 X |

Primary Examiner—Willie G. Abercrombie
Attorney, Agent, or Firm—James E. Nilles

[57] ABSTRACT

A sheet metal shears for metal sheets and plates with a highly sensitive surface comprises: a sheet metal infeed platen with a lower blade secured to the edge thereof extending transversely to the direction of sheet advance; a sheet stop disposed in spaced relation from the lower blade in the direction of sheet advance; a movable top blade which in cooperation with the lower blade cuts sheet metal strips from the metal sheet which is advanced over the lower blade up to the sheet stop; and a support means for the sheet metal strips including a movable table which may be extended to support said strips prior to and during the cutting operation in a support plane which is a continuation of the surface of the sheet metal infeed platen and which may be retracted to enable the cut metal strips to fall vertically after they are cut from the sheet. The support table when extended prevents the free edge of the sheet which has been pushed beyond the lower blade from sagging downwardly due to the inherent weight of the sheet. The support table when retracted allows the strips to fall but does not scratch the undersurface of the strips as it retracts.

7 Claims, 1 Drawing Figure

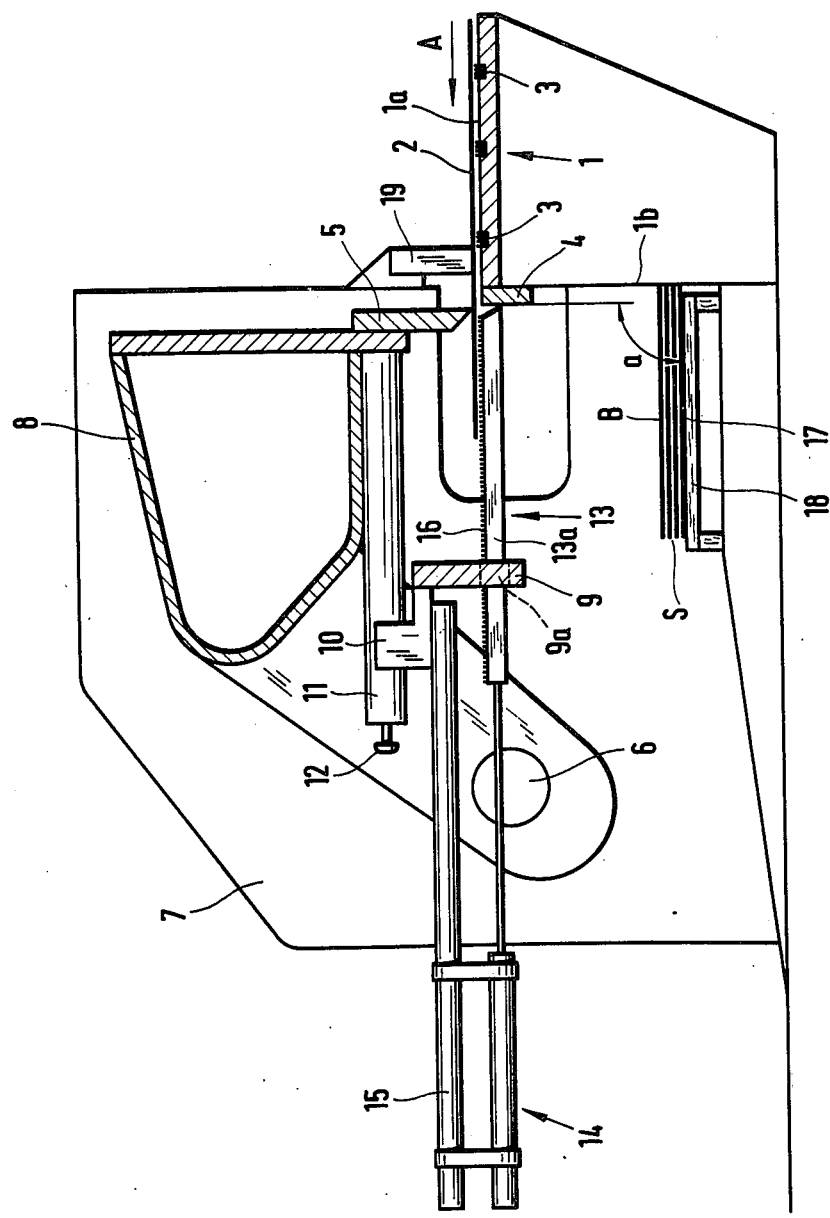

SHEET METAL SHEARS FOR METAL SHEETS AND PLATES WITH A HIGHLY SENSITIVE SURFACE

This invention relates to sheet metal shears for metal sheets and plates with a highly sensitive surface, comprising a sheet metal infeed platen with a lower blade secured to the edge thereof extending transversely to the direction of sheet advance, a sheet stop disposed in spaced relation from the lower blade in the direction of sheet advance, a movable top blade which in cooperation with the lower blade cuts sheet metal strips from the metal sheet which is advanced over the lower blade up to the sheet top, and further comprising a support means for the sheet metal strips which may be extended and retracted and which supports said strips prior to and during the cutting operation in a support plane which is a continuation of the surface of the sheet metal infeed platen.

The function of the support means is to prevent the free edge of the sheet which has been pushed beyond the lower blade from sagging downwardly due to the inherent weight of the sheet. If the freely projecting section of the sheet bends downwardly, the sheet scrapes across the cutting edge of the lower blade, thereby causing the sensitive surface to be scratched. Moreover, the actual sheet width between the stop and the lower blade no longer corresponds to the set width so that strips that are cut will be too wide.

A known support means for sheet metal shears of the type cited at the outset consists of a plurality of rows parallel to the direction of sheet advance and consisting of vertically disposed piston-cylinder units whose pistons can have their free ends extended into the support plane. Between the rows conveyor belts moving in the direction of sheet advance are arranged upon which the sheet strips are deposited by the pistons withdrawn below the conveyor belt plane. This support device has a very expensive construction and is prone to breakdown and failure. Furthermore, it suffers from the great drawback that it transports the sheet strips individually in the direction of sheet advance. Normally, however, a stack of sheet strips is desired for further processing operations so that an additional stacking device must be attached to the known support means. Apart from the additional construction and expense associated with such a stacking means, this also presents the danger that the sheet strips will suffer surface damage during stacking.

Another known support means of sheet metal shears of the afore-stated type has a flap mounted directly adjacent the lower blade so as to be pivotal about an axis parallel thereto. The flap lies in the support plane in its upper position and the edge thereof which faces the sheet stop can be swung downwardly after completion of the cut. The sheet metal strip lying on the flap is thereby caused to slide downwardly in an inclined position into a stacking vessel. This support means as well suffers from the drawback that it necessitates an additional stacking vessel. Since the sheet strips glide into this stacking vessel in an inclined position, the leading edge thereof in the direction of glide scrapes over sheet strips already deposited, thereby damaging their surfaces.

When cutting metal sheets and plates with a highly sensitive surface, the situation is remedied in practice by providing a second operator who crouches in the space below the area between the lower blade and the sheet stop and who supports with his hands the inserted sheet section on the bottom. He carefully lowers and deposits it after it is cut. This is necessary when the sheet metal cutting width exceeds 130 mm. In this way sheet strips are cut off of sheet metal panels which originally are 2 × 1 m in size and from 0.6 – 6 mm thick without damaging the surfaces thereof. The additional worker, however, increases the costs of strip cutting considerably. In addition, this work is unpleasant and rather dangerous.

The object of this invention is to provide a support means for sheet metal shears of the type cited at the outset which permits simple construction, stacking of the sheet strips without any special stacking means and which avoids surface damage during stacking.

This object is accomplished in accordance with the invention in that the support means consists of a support table 13 which may be moved in the support plane into and out of the space between the lower blade 4 and the sheet stop 9.

The support means of the metal shears in accordance with the invention consists of a support table which may be slid in the support plane itself. Such a support table is characterized by simple construction and is less prone to failure and malfunction. It has been found to be rather surprising that the sheet strips which are cut off fall downwardly when the support table in rapidly withdrawn in a generally horizontal position and can be stacked there on a stacking surface without any additional auxiliary means. The sheet strips impinge on the stacking surface or on the already stacked sheet strips across their entire area and are cushioned by the trapped air. It has been found that no damage occurs to the highly sensitive surface of the sheets when stacking in this manner. Hence, a stack of sheet strips with perfect surfaces may be removed directly from the sheet metal shears.

According to an expedient further development of the invention, it is provided that the support table may be moved into and out of the space through the sheet stop contrary to or in the direction of sheet advance.

In this embodiment, the sheet stop simultaneously functions as a wiper element for pushing off the sheet strips lying on the support table.

The support table advantageously consists of two or more parallel bars.

Such bars are easier to guide and to move than a plateshaped table. Foreign matter may fall downwardly through the interstices between the bars so that the surface of the bar which supports the metal sheet remains clean. If the support table is moved through the sheet stop, the design comprising individual bars has the advantage that the bridges which remain in the sheet stop between the openings guiding the bars form a reliable stop for the leading edge of the sheet. If a flat support table is employed in this construction, there is danger that the leading edge of the sheet will get inbetween the support table and the slot in the sheet stop which guides the support table.

The support table surface is expediently covered with soft elements which reduce friction, e.g. bristles, thereby reliably preventing damage to the lower surface of the sheet when sliding it on the support table and when retracting the same.

In sheet metal shears in which the sheet stop is mounted on an adjustable stop girder, it is provided according to an expedient further development of the invention that the support table and its drive means are also mounted on the stop girder.

This measure is advantageous in that no adjustment or setting of the support table or the drive means thereof is required when the stop is readjusted. The relative position from the support table to the sheet stop remains equal in this case so that the retracted position of the support table, which is adjusted and set only once, also remains constant when the stop is adjusted. The extended position of the support table is determined when the support table edge hits the lower blade.

One embodiment of the invention is illustrated in the drawing whose only FIG. shows a schematic vertical section through sheet metal shears in accordance with the invention.

In the drawing, 1 indicates a sheet infeed platen on which a sheet 2 with a highly sensitive surface, e.g. stainless steel sheet metal, may be advanced in the direction of sheet advance as indicated by arrow A. In order to prevent damage to the surface of the sheet on the infeed platen 1 and to ensure low resistance to the forward movement, rows of bristles 3 are inserted in the surface 1a of the infeed platen 1. The sheet 2 glides along the free ends of the bristles.

A lower blade 4 is secured to the infeed platen 1 at the leading edge thereof in the direction of sheet advance such that the cutting edge thereof is in a plane with the surface 1a of the infeed platen. A mobile top blade 5 cooperates with the stationary lower blade 4 and is secured at 6 to a swivelling support 8 which is pivotally mounted in a machine housing 7. Moreover a sheet stop 9 positioned opposite and in spaced relation to the lower blade 4 in the direction of sheet advance A is mounted on the swivelling support 8. The sheet stop 9 is fixed on a stop support 10 which is slidable by means of a set screw 12 along an adjustment guide 11 rigidly connected with the swivelling support 8, thereby permitting an adjustment of the spacing between the lower blade 4 and the sheet stop 9.

Above the infeed platen 1 there is provided a vertically reciprocating sheet holding down device 19 for clamping the sheet metal 2 to the infeed platen 1.

The sheet metal shears also have a support table 13 which may be reciprocated horizontally in the sheet stop 9 in the direction and contrary to the direction of sheet advance A by means of a piston-cylinder operating unit 14. The operating unit 14 is supported on the stop support 10 via a girder 15.

In the preferred embodiment of the invention, the support table 13 consists of two or more bars positioned parallel to one another with interstices, of which only bar 13a can be seen in the drawing. All of these bars are mounted in rectangular openings of the sheet stop 9 so as to be slidable in parallel to one another. Each of the bars is associated with its own piston-cylinder operating unit. The bars are provided with bristles 16 on their upper surfaces.

The support table 13 consisting of individual bars 13a is positioned at such a height that it can be moved in the support plane for the metal sheet 2 defined by the surface 1a of the infeed platen 1 and the cutting edge of the lower blade 4.

A stacking surface 17 is present inside the space between the lower blade 4 and the sheet stop 9 and may be formed, for example, by the surface of a palette 18.

The afore-described sheet metal shears operate in the following manner:

When the top blade 5 is raised somewhat out of the position illustrated in the drawing, the metal sheet 2 is advanced in the direction of sheet advance A of the infeed platen 1 and the lower blade 4 until the leading edge of the metal sheet abuts against the sheet stop 9. In so doing, the bars 13a of the support table 13 are located in the illustrated position in which the piston-cylinder operating units thereof have slid them outwardly through openings 9a in the sheet stop 9 until they abut on the lower blade 4. The support table 13 supports the metal sheet 2 from underneath so that it remains between the lower blade 4 and the sheet stop 9 in the same plane in which it was supplied on the support table surface 1a. As soon as the metal sheet 2 has reached the stop 9, the holding-down device 19 is moved downwardly and the swivelling support 8 is pivoted in a clockwise direction by a drive means (not shown) in a manner known in the case of sheet metal shears so that the top blade 5 cuts a strip B of sheet metal from the sheet 2 in cooperation with the lower blade 4. The top blade 5 has a cutting angle of approx. 2° to 6° with respect to the lower blade 4. The width of the sheet metal strip corresponds to the spacing between the lower blade 4 and the stop 9 and may be determined by correspondingly adjusting the stop 9 by means of the set screw 12. After the metal has been cut, the top blade 5 is raised again.

At the beginning of the cut, the bars 13a of the support table 13 are retracted abruptly to the left in the drawing by means of the associated piston-cylinder operating units 14 so that the outer ends thereof disappear in the sheet stop 9 at the very moment the cut is completed. The sheet metal strip is maintained at the stop 9 alongs its entire length during the cutting operation.

The completion of the retraction of the table 13 is defined by the abutment of the piston at the rear end of the cylinder of the piston-cylinder operating unit 14. This position is not changed even if the sheet stop 9 is adjusted because the support table 13 together with all driving parts follows the movements of the sheet stop 9.

When the support table 13 is located in its retracted position, the sheet metal strip B which has just been cut falls downwardly substantially in a horizontal position and comes to lie on the stacking surface 17 or on the stack S which has already been formed there. This fall is cushioned by air resistance. The operation can now again begin anew.

The stacking surface 17 forms an angle $a$ of approx. 80°-87° with the extended edge continuation of the lower blade 4. This slight inclination permits the strips to be stacked accurately. Each metal sheet glides through the trapped air until it hits on the vertical wall 1b of the platen 1. The sheets are aligned laterally by means of run-in brackets (not shown).

As soon as the stack S has attained the desired height, it is removed on the palette 18 and transported to further processing operations and a new, empty palette is positioned in the area underneath the space between the lower blade 4 and the sheet stop 9.

The invention is not limited to the illustrated embodiment. Another type of sheet metal shears could of course be designed in accordance with the invention. For instance, sheet metal shears exist in which the top blade is moved up and down in a vertical plane. The support table 13 could also be moved into the space between the lower blade 4 and the sheet stop 9 transversely to the direction of advance A. In so doing, however, a wiping means or wiper element would have to cooperate therewith during the withdrawal movement to push the metal strip which has been cut off of the support table. The support table could possibly be moved through the lower blade 4 as well, but would then have to have a recess adjacent the top blade and could be moved only if the top blade is located in its raised position. In addition, the table in this case would have to make a pivotal movement in addition to its pushing movement in order to be able to be positioned accurately in the support plane. Hence, this solution would be substantially more expensive. Instead of the individual bars, the support table could also consist of a unitary plate. Special precautions, however, would have to be taken in this case in order to prevent the metal sheet from the penetrating into the slot which guides the support table in the sheet stop.

What is claimed is:

1. Sheet metal shears for metal sheets and plates with a highly sensitive surface comprising: a sheet metal infeed platen with a lower blade secured to the edge thereof extending transversely to the direction of sheet advance, a sheet stop disposed in spaced relation from the lower blade in the direction of sheet advance, a movable top blade which in cooperation with the lower blade cuts sheet metal strips from the metal sheet which is advanced over the lower blade up to the sheet stop, a support means including a support table for the sheet metal strips which supports said strips horizontally prior to and during the cutting operation in a horizontal support plane which is a continuation of the surface of the sheet metal infeed platen, and said support means further including drive means for reciprocating said support table horizontally in said horizontal support plane into and out of the space between said lower blade and said sheet stop.

2. Sheet metal shears according to claim 1, wherein said support table may be moved into and out of said space through an opening in said sheet stop contrary to or in the direction of sheet advance.

3. Sheet metal shears according to claim 1, wherein said support table comprises at least two parallel bars.

4. Sheet metal shears according to claim 1, wherein said support table surface is covered with soft elements which reduce friction.

5. Sheet metal shears according to claim 1, including an adjustable stop girder, and wherein said sheet stop, wherein said support table and wherein said drive means are mounted on said adjustable stop girder.

6. Sheet metal shears according to claim 1, wherein said drive means comprises at least one fluid actuated piston-cylinder operating unit which serves to drive said support table.

7. Sheet metal shears according to claim 1, including a vertical wall and a horizontal stacking surface which is provided to catch the cut sheet metal strips, which stacking surface forms an angle of approximately 80° to 87° with said vertical wall.

* * * * *